US007519689B2

(12) United States Patent
Mohan et al.

(10) Patent No.: US 7,519,689 B2
(45) Date of Patent: Apr. 14, 2009

(54) METHOD AND SYSTEM TO PROVIDE MESSAGE COMMUNICATION BETWEEN DIFFERENT BROWSER BASED APPLICATIONS RUNNING ON A DESKTOP

(76) Inventors: Prabhuram Mohan, 1530 Prosperity Ct., San Jose, CA (US) 95131; Krishnakumar Pandurangan, 3638 Springbrook Ave., San Jose, CA (US) 95148

( * ) Notice: Subject to any disclaimer, the term of this patent is extended or adjusted under 35 U.S.C. 154(b) by 897 days.

(21) Appl. No.: 10/660,418

(22) Filed: Sep. 10, 2003

(65) Prior Publication Data
US 2005/0055458 A1    Mar. 10, 2005

(51) Int. Cl.
*G06F 15/16* (2006.01)
(52) U.S. Cl. .................. 709/219; 709/203; 709/217
(58) Field of Classification Search ........... 709/238, 709/203, 217, 219; 713/153
See application file for complete search history.

(56) References Cited

U.S. PATENT DOCUMENTS

| 5,555,179 | A | 9/1996 | Koyama et al. |
|---|---|---|---|
| 5,765,033 | A | 6/1998 | Miloslavsky |
| 5,926,539 | A | 7/1999 | Shtivelman |
| 5,946,387 | A | 8/1999 | Miloslavsky |
| 5,953,332 | A | 9/1999 | Miloslavsky |
| 5,953,405 | A | 9/1999 | Miloslavsky |
| 6,002,760 | A | 12/1999 | Gisby |
| 6,021,428 | A | 2/2000 | Miloslavsky |
| 6,044,145 | A | 3/2000 | Kelly et al. |
| 6,044,368 | A | 3/2000 | Powers |
| 6,067,357 | A | 5/2000 | Kishinsky et al. |
| 6,108,711 | A | 8/2000 | Beck et al. |
| 6,138,139 | A | 10/2000 | Beck et al. |
| 6,167,395 | A | 12/2000 | Beck et al. |
| 6,170,011 | B1 | 1/2001 | Beck et al. |
| 6,175,563 | B1 | 1/2001 | Miloslavsky |
| 6,175,564 | B1 | 1/2001 | Miloslavsky et al. |
| 6,185,292 | B1 | 2/2001 | Miloslavsky |
| 6,332,158 | B1 * | 12/2001 | Risley et al. ............. 709/219 |
| 6,345,305 | B1 | 2/2002 | Beck et al. |
| 6,373,836 | B1 | 4/2002 | Deryugin et al. |
| 6,389,007 | B1 | 5/2002 | Shenkman et al. |
| 6,393,015 | B1 | 5/2002 | Shtivelman |
| 6,430,462 | B1 | 8/2002 | Lubcke et al. |
| 6,430,602 | B1 | 8/2002 | Kay et al. |

(Continued)

FOREIGN PATENT DOCUMENTS

JP    2000041107 A2    2/2000

OTHER PUBLICATIONS

Refsnes Data "HTML Links" <http://www.w3schools.com/html/html_links.asp> Aug. 2, 2002 accessed Jan. 3, 2008.*

(Continued)

*Primary Examiner*—Moustafa M Meky
*Assistant Examiner*—Philip J Chea

(57) ABSTRACT

A method and system to facilitate the communication of data and/or messages between different Internet domains include, at a first application associated with a first Internet domain, embedding data in an anchor portion of a URL string. The URL string identifies a second Internet domain that is different from the first Internet domain. This URL string is communicated to a second application associated with the second Internet domain. At the second application, the received URL string is parsed, and the relevant data extracted therefrom.

16 Claims, 9 Drawing Sheets

U.S. PATENT DOCUMENTS

| | | | |
|---|---|---|---|
| 6,484,180 B1 * | 11/2002 | Lyons et al. | 707/103 R |
| 6,704,771 B1 * | 3/2004 | Gough | 709/206 |
| 6,732,156 B2 | 5/2004 | Miloslavsky | |
| 6,778,661 B1 | 8/2004 | Yumoto et al. | |
| 6,963,928 B1 * | 11/2005 | Bagley et al. | 709/245 |
| 2001/0054064 A1 | 12/2001 | Kannan | |
| 2002/0054139 A1 * | 5/2002 | Corboy et al. | 345/804 |
| 2002/0078014 A1 * | 6/2002 | Pallmann | 707/1 |
| 2002/0107910 A1 * | 8/2002 | Zhao | 709/203 |
| 2002/0129239 A1 * | 9/2002 | Clark | 713/153 |
| 2004/0117376 A1 * | 6/2004 | Lavin et al. | 707/10 |
| 2004/0128540 A1 * | 7/2004 | Roskind | 713/201 |
| 2005/0055458 A1 | 3/2005 | Mohan et al. | |
| 2005/0111653 A1 | 5/2005 | Joyce et al. | |

OTHER PUBLICATIONS

"How Java to Javascript Communication Works in Java Plug-in", http://web.archive.org/web/20030415182237/http%3A//java.sun.com/products/plugin/1.3/docs/isobject.html, (Apr. 12, 2003),5 pages.

"Javascript for Beginners—JavaScript Security, Same Origin Policy", *JavaScript Guide*, (unknown),1 pg.

Idocs Inc., "HTML Code Tutorial—Attribute for HREF equals URL", *The Idocs guide to HTML*, (Copyright 1997-2002),1 pg.

Idocs Inc., "HTML Code Tutorial—Name equals text string", *The Idocs guide to HTML*, (Copyright 1997-2002),2 pgs.

Miller, Fred A., "[Am-info] Opera Frame Location Same Origin Policy Circumvention Vulnerability", http://lists.essential.org/pipermail/am-info/Week-of-Mon-20020520/010139.html. (May 21, 2002),2 pgs.

Ranganathan, Arun K., "Bypassing Security Restrictions and Signing Code", http://devedge-temp.mozilla.org/viewsource/2002/bypassing-security-restrictions/index_en.html, (Nov. 11, 2002),2 pages.

Ruberman, Jesse, "The Same Origin Policy—Mozilla.org", http://www.mozilla.org/projects/security/components/same-origin.html, (Aug. 24, 2001),1 pg.

Woychowsky, Edmond, "JavaScript security improvements", Builder.com, ZDNET Australia Power Centre Presents: Solve integration with the IBM Business Integration success kit; E. Woychowsky, Builder.com,(Apr. 30, 2003),3 pgs.

"ActiveBuddy and MessageVine team up to bring interactive agent technology to MessageVine?s instant messaging customers", M2 Presswire, (Nov. 14, 2001), 2 pgs.

"Face Time Communications and eLoyalty Parter to Deliver Access to Public Instant Messaging Networks for Call Center", FaceTime Communications Press Release, (Aug. 14, 2001), 2 pgs.

"FaceTime Communications and SRA International, Inc. Partner to Deliver Integrated Solutions for Financial Services Regulatory Compliance", FaceTime Communications Press Release, (Nov. 12, 2001), 2 pgs.

Naraine, Ryan, "When Software Patents Go Bad", Internetnews.com, (Sep. 13, 2002), 4 pgs.

Yumoto, K, et al., "Multimedia Call Distribution System", Hitachi Ltd. Japan, (Sep. 8,), 1 pg.

* cited by examiner

METHOD AND SYSTEM TO PROVIDE MESSAGE COMMUNICATION BETWEEN DIFFERENT BROWSER BASED APPLICATIONS RUNNING ON A DESKTOP

FIELD OF THE INVENTION

The present invention relates generally to the field of data communications and, and in one embodiment, to the communication of data between the network-based applications.

BACKGROUND OF THE INVENTION

Many modern applications are browser-based so as to render these applications portable, and to provide the advantage of zero-install requirements on a computer system. For various security reasons, current browsers (e.g., the Internet Explorer (IE) browser developed by Microsoft Corporation of Redmond, Wash. State, and the Mozilla browser developed by the Mozilla Organization) implement policies, typically known as the "Same Origin Policy", that prevent one application being supported within a browser instance and coming from a particular domain (e.g., www.domainA.com), from communicating with another application supported in a further browser instance and coming from a different domain (e.g., www.domainX.com), even though both browser instances are executing on the same computer system.

FIG. 1 is a block diagram illustrating a client machine 10 that hosts a browser application, for which three browser instances 12, 14 and 16 have been opened. Each of the browser instances 12, 14 and 16 may be viewed as providing a "thin client" for the relevant browser-based application. Specifically, browser instance 12 is shown to support an application A client, browser instance 14 is shown to support an application B client, and browser instance 16 is shown to support an application X client. Turning to the server side, a first domain 18 (e.g., domainA, identified by the domain name "www.domainA.com") is shown to include respective application servers 20 and 22 for each of the browser-based applications A and B. Browser instance 12 communicates with the application server 20 via a network 23 (e.g., the Internet), and the browser instance 14 communicates with the application server 22, again via the network 23.

As each of the browser instances 12 and 14 supports an application client for a browser-based application at a common domain (e.g., domainA), communications between the browser-based applications A and B is permitted, in terms of the "Same Origin Policy", on the client machine 10, and specifically between the browser instances 12 and 14. These communications are indicated by the line 24.

However, turning to the browser-based application X, which is supported by the browser instance 16 and application server 28, and hosted on the domain 26 (i.e., the domainX identified by www.domainX.com), communications between the browser instance 16 and the other browser instances 12 and 14 is prohibited in terms of the "Same Origin Policy" as a result of the browser-based application X being supported on a different domain from the domain on which the browser-based applications A and B are supported.

To enable communications between browser-based applications that are hosted on different domains (e.g., domains 18 and 26), one option is to modify the applications so that communications occur between servers supporting the relevant applications, as indicated for example by the arrow 30. However, such modifications to the browser-based applications may be problematic for a number of reasons, not least of which is that access is required to both of these applications.

Another manner in which communication between browser-based applications hosted on different domains may be facilitated is for a browser instance (e.g., browser instance 14) associated with a particular domain (e.g., domain 18) to issue a page request to an application server (e.g., application server 28) on a different domain (e.g., domain 26). However, this method is disadvantageous in that it involves a server round trip for a page to eventually load within the browser instance 16, this round trip potentially being expensive in real time scenarios. The arrows 32 in FIG. 1 indicate this communication path.

FIG. 2 is an interaction flow chart illustrating the communication of message content from an application, associated with the domain 18 (i.e., domainA) to an application associated with the domain 26 (i.e., domainX). As illustrated in FIG. 2, following identification of message content at block 34, the application client 12 at block 36 communicates the identified message content to the application server 28, the application server 28 being associated with a different domain from the domain with which the client application 12 is associated. At block 38, the application server 28 receives the message content, and possibly performs a function utilizing this message content. At block 40, the application server 28 then communicates a result of the function to the application client 16, which is again associated with the same domain as the application server 28 (i.e., domainX). At block 42, the application client 16 may display the result of the function, for example as a web page. It will be appreciated that the methodology discussed with reference to FIG. 2 involves the "round trip" to the server, which presents the disadvantages discussed above.

SUMMARY OF THE INVENTION

According to a further aspect of the present invention, there is provided a method to facilitate the communication of data between different Internet domains. First and second embedded applications, retrievable from a first Internet domain, are configured to communicate data to each other. At a server associated with a first Internet domain, responsive to a request from a first client application associated with the first Internet domain, the first embedded application is communicated to the first client application. At the server associated with the first Internet domain, responsive to a request from a second client application associated with a second Internet domain, the second embedded application is communicated to the second client application.

According to a further aspect of the present invention, there is provided a method to facilitate the communication on data between different Internet domains. First and second embedded applications, retrievable from a first Internet domain, are configured to communicate data to each other. At a server associated with a first Internet domain, responsive to a request from a first client application associated with the first Internet domain, the first embedded application is communicated to the first client application. At the server associated with the first Internet domain, responsive to a request from a second client application associated with a second Internet domain, the second embedded application is communicated to the second client application.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and a system to communicate data between different Internet domains are described. In the following description, for purposes of explanation, numerous specific details are set forth in order to provide a thorough understanding of the present invention. It will be evident, however, to one skilled in the art that the present invention may be practiced without these specific details.

One aspect of the present invention provides a method to enable the communication of data between applications, associated with different Internet domains, without requiring that the data be continually communicated to a server for eventual communication to an associated client. An understanding of one exemplary embodiment of the present invention will be assisted by a brief description of the syntax of Uniform Resource Locators (URLs), and the manners in which browser applications utilize such URLs.

A browser application will typically reload data (e.g., a web page) when the browser application receives a URL that includes different parameters. For example, a browser application may receive a URL as a result of a user typing the URL into an input line. Alternatively, a browser application may receive a URL as a result of user "clicking" on a hypertext link that is included in a web page being displayed. A browser application can also receive a URL from a number of other sources including from another instance of a particular browser application that is executing on a machine. For example, where a particular browser instance receives the URL "http://www.domainA.com/a.html", the browser application will load a page identified by that URL from an appropriate server at the domain "domainA." If the same browser instance then subsequently receives a further URL "http://www.domainA.com/a.html?a=21", the browser application will reload a page by making a request to the appropriate server, this request involving a passing of the parameter "a=21". In short, when a browser instance receives a URL that is different from the URL that it most recently received, this will typically cause the browser instance to issue a request to an appropriate server, identified by the URL. Further, unless special properties are set for the page, the browser would be forced to load even if the URL is the same.

Figure 1:
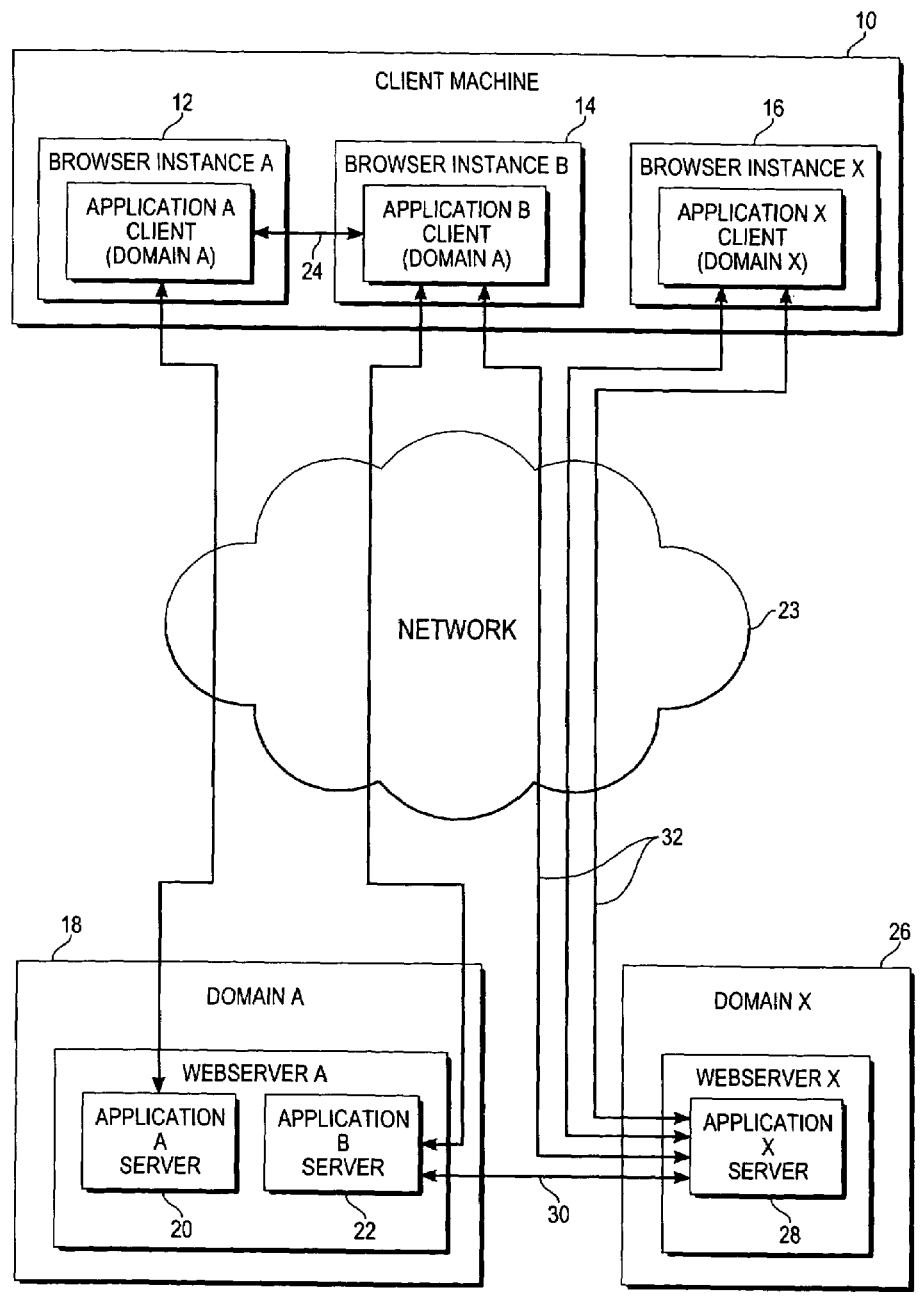
FIG. 1 is a block diagram illustrating a prior art scenario in which communications between browser-based applications occurs at a server-side.
Figure 2:
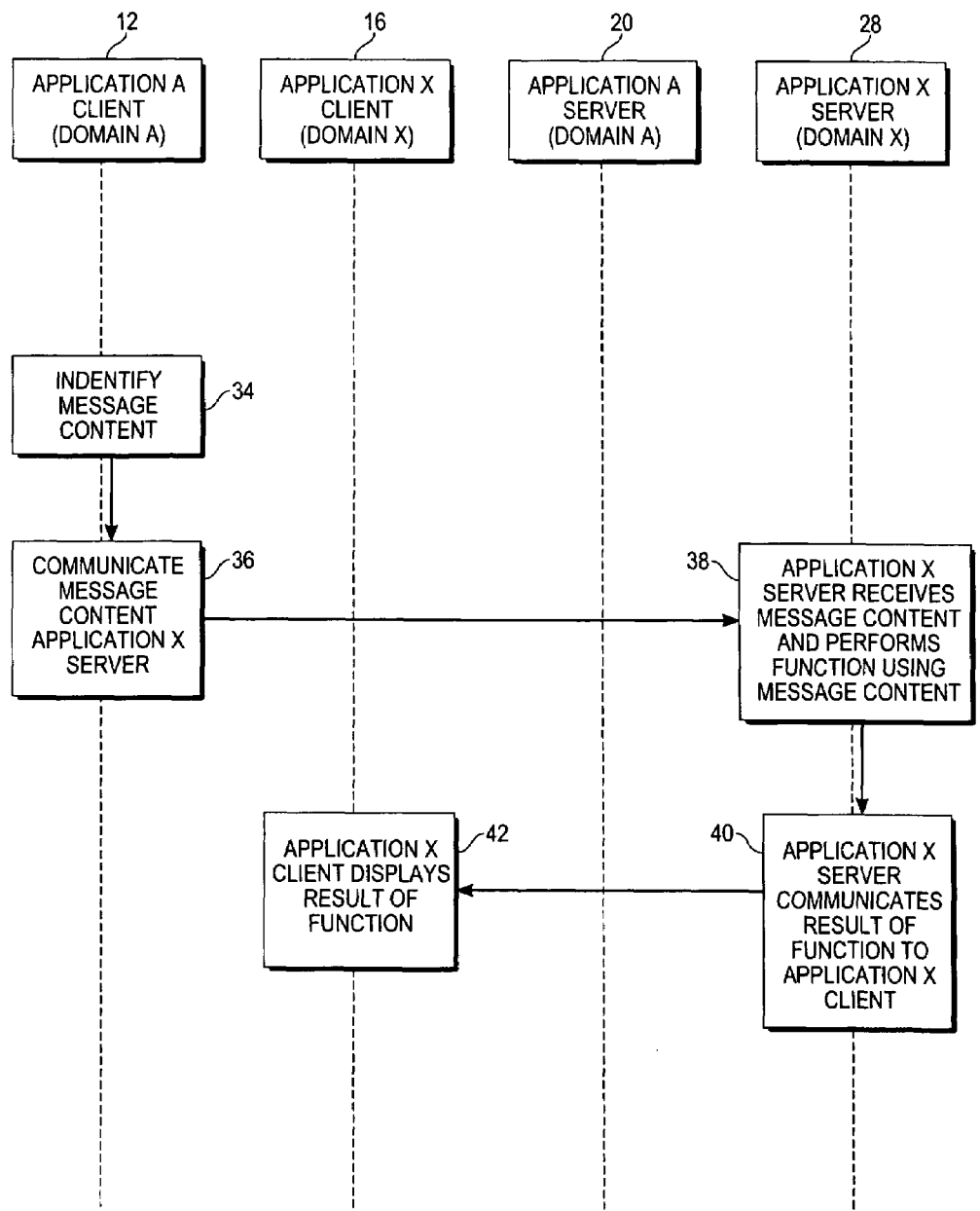
FIG. 2 is an interaction flow chart illustrating how, in the prior art, communications between browser-based applications occurs at the server-side.
Figure 3:
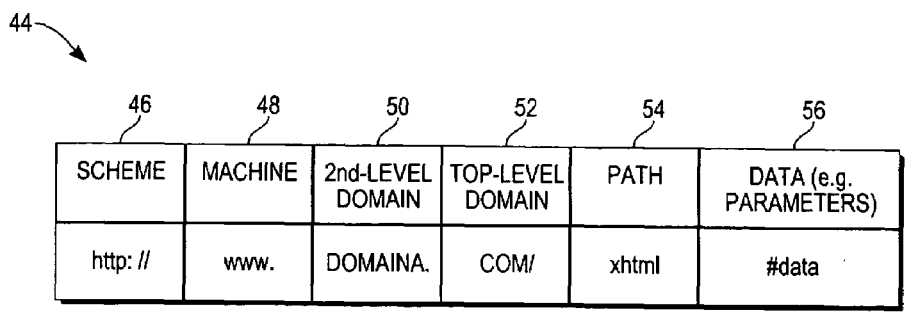
FIG. 3 is a diagrammatic representation of the structure of an exemplary URL.

FIG. 3 is a diagrammatic representation of the syntax of an exemplary URL 44. The URL 44 includes a number of portions, namely a scheme portion 46 that identifies a scheme (e.g., http, gopher, ftp, news, etc.) for the URL 44, a machine portion that identifies the type of machine to which the URL is directed (e.g., a World Wide Web (www) machine), a second-level domain portion 50 that indicates a second-level domain to which the URL 44 is addressed, a top level domain portion 52 that indicates a top level domain (e.g., an organization or a country), a path portion 54 that typically indicates a path at the identified domain, and possibly a data portion 46 that may include data (e.g., a message, parameter, value, etc.) to be communicated to the identified domain.

For the purposes of the present invention, any of the above portions 46-52 may be regarded as identifying a domain.

Browser applications also typically support a so-called "linking" feature, which will move a page being displayed by a browser instance to a specific position on the page. This linking feature is typically implemented utilizing so-called "anchors". An "anchor" may be regarded, in one exemplary embodiment, as a location in a document or data set that is the target of a hypertext link.

Figure 4:
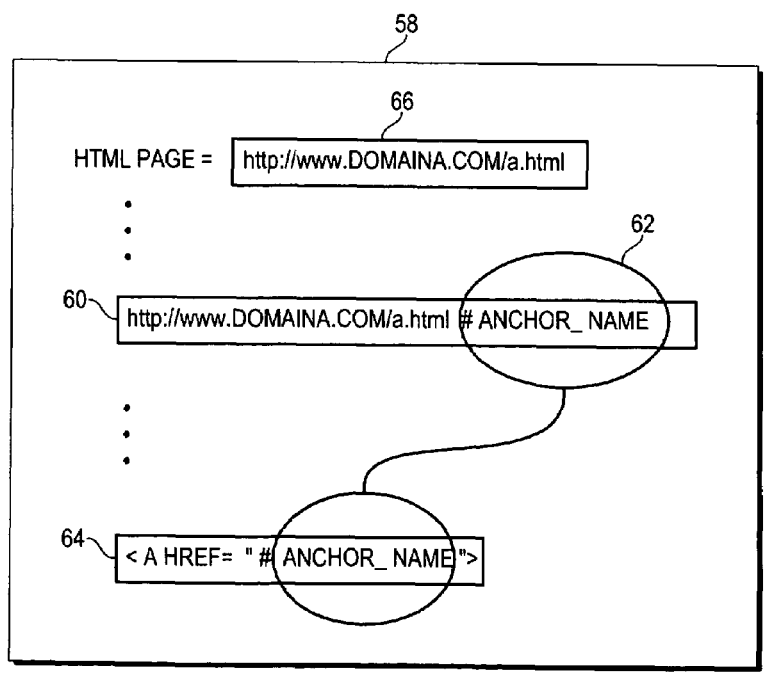
FIG. 4 is a diagrammatic representation of a markup language document that is shown to include a hypertext link that in turn includes an anchor portion.

FIG. 4 is a diagrammatic representation of a markup language document 58 (e.g., an HTML document) that is shown to include hypertext link 60, which in turn includes an anchor portion 62. As illustrated, the anchor portion 62 is denoted by the inclusion of a hash symbol (#) within the URL string that comprises the link 60. Specifically, text after the hash symbol constitutes a "name" attribute can be used to link to an anchor location 64 within the same document. Such an anchor location 64 is shown to be included within the markup language document 58, and identifies the anchor "name". Accordingly, a user, by clicking on the link 60, will cause a display of the markup language document 58 to be adjusted by the browser instance so the anchor location 64 within the document 58 is brought into view of the user. For example, the document 58 might be scrolled by the browser instance to bring the anchor location 64 into the display window of the browser instance.

It should be noted that when a user selects a hypertext link, such as the link 60, that identifies an anchor (e.g., has an anchor portion 62), the relevant browser instance does not reload the document (e.g., a markup language document 58) from the server identified if the "anchor" is part of the URL identifying a document currently being displayed by the browser instance. For example, with reference to FIG. 4, consider that the document 58 currently being displayed by the browser instance is identified by the URL 66. It will be noted that the URL for the link 60 corresponds exactly to the URL 66, except that the anchor portion 62 is appended thereto. Accordingly, when a user selects the link 60, the URL 66 for the current page is identified as corresponding to the URL for the link 60 except for the anchor portion 62. Accordingly, the browser instance will not reload the document 58, identified by the URL for the link 60 from a server, but will simply scroll the display of the document 58 to bring the anchor location 64 into view.

Should a browser instance attempt to jump to an anchor identified by link 60 in an already loaded document, and the relevant anchor is not located, the browser instance does not take any further action. However, when the browser instance does attempt to locate the anchor, the URL that is registered by the browser instance is changed to the URL for the most recently selected "anchor-referencing" link 60. Accordingly, should a user select the link 60, the URL registered by the browser instance for the displayed document 58 would be changed to the URL that is illustrated in FIG. 4 as being associated with the link 60. In short, input of a URL string to a browser instance that identifies an anchor within the same document, regardless of whether the identified anchor actually exists or not, will cause the URL string registered by the browser instance to change.

According to one embodiment of the invention, this above-described "anchor" functionality is utilized to pass data (e.g., messages) between different Internet domains at the client-side, and without necessarily invoking a server-side access operation. Further details will now be described with reference to FIGS. 5-7.

Figure 5:
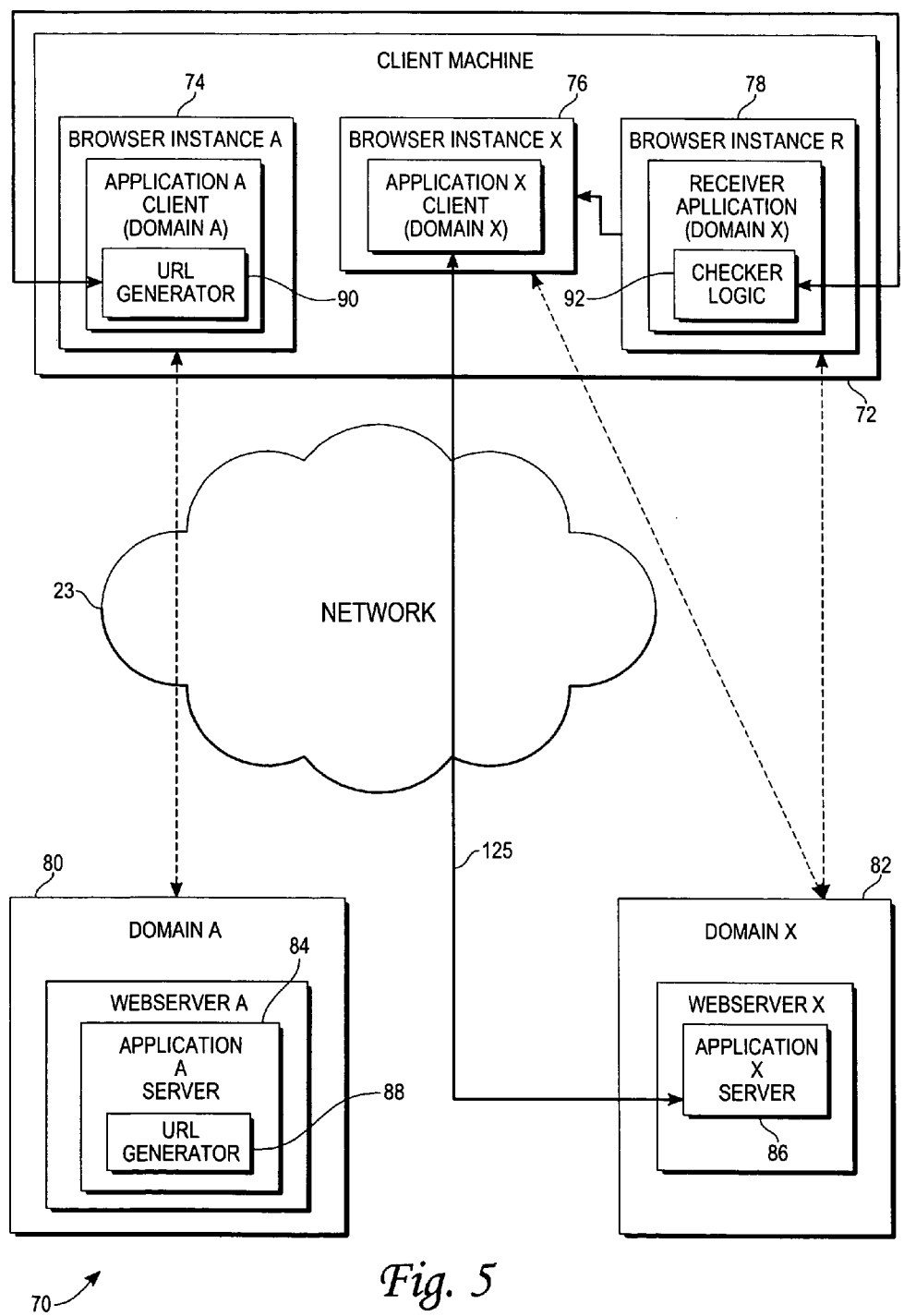
FIG. 5 is a block diagram illustrating a system, according to an exemplary embodiment of the present invention, to communicate data between applications associated with different Internet domains, where such communication of data occurs at the client-side.

FIG. 5 is a block diagram illustrating a networked environment 70, in which one exemplary embodiment of the present invention is shown to be implemented. Specifically, a client machine 72 hosts a browser application, three instances of which are shown to be executing to provide three browser instances, namely browser instances 74, 76 and 78. The browser instance 74 operates as a first application client for an application associated with a first Internet domain (e.g., application A associated with the domainA). The browser instance 76 similarly operates as an application client for a further application associated with a further domain (application X associated with domainX).

FIG. 5 also illustrates a further browser instance 78, which in the exemplary embodiment of the present invention does not present a display window to the user, and which operates as a receiver client, the functioning of which will be described in further detail below.

Turning to the server-side, each of the first and second domains host a respective application server for a respective browser-based application. Specifically, the first domain 80 hosts a first application server 84, and the second domain 82 hosts a second application server 86.

In the exemplary embodiment, the first application server 84 associated with the first domain 80 is shown to include a URL generator 88 (e.g., a script) that operates to generate URL strings that may be utilized, in accordance with the exemplary embodiment, to communicate data to the second domain 82, and specifically to the browser instance 76, without requiring a round trip access to the servers associated with the second domain 82. In one embodiment, the browser instance 74 may also include a URL generator 90 to enable the generation of URL strings on the client-side. In any event, it will be appreciated that, in various embodiments of the present invention, URL strings that are useful for implementing the present invention may be generated at either the client-side, server-side, or at both the client and the server side. The URL generator 90 may, for example, be a script or an applet that is called by HTML communicated to the browser instance 74 from the application server 84. The URL generator 88 may similarly be a script or other application that executes on the server-side.

The browser instance 78, which operates as the receiver client, is also shown in FIG. 5 to include checker logic 92, to monitor changes in the URL registered for the particular browser instance 78, and to perform a parsing function when a change in the URL is detected.

Figure 6:
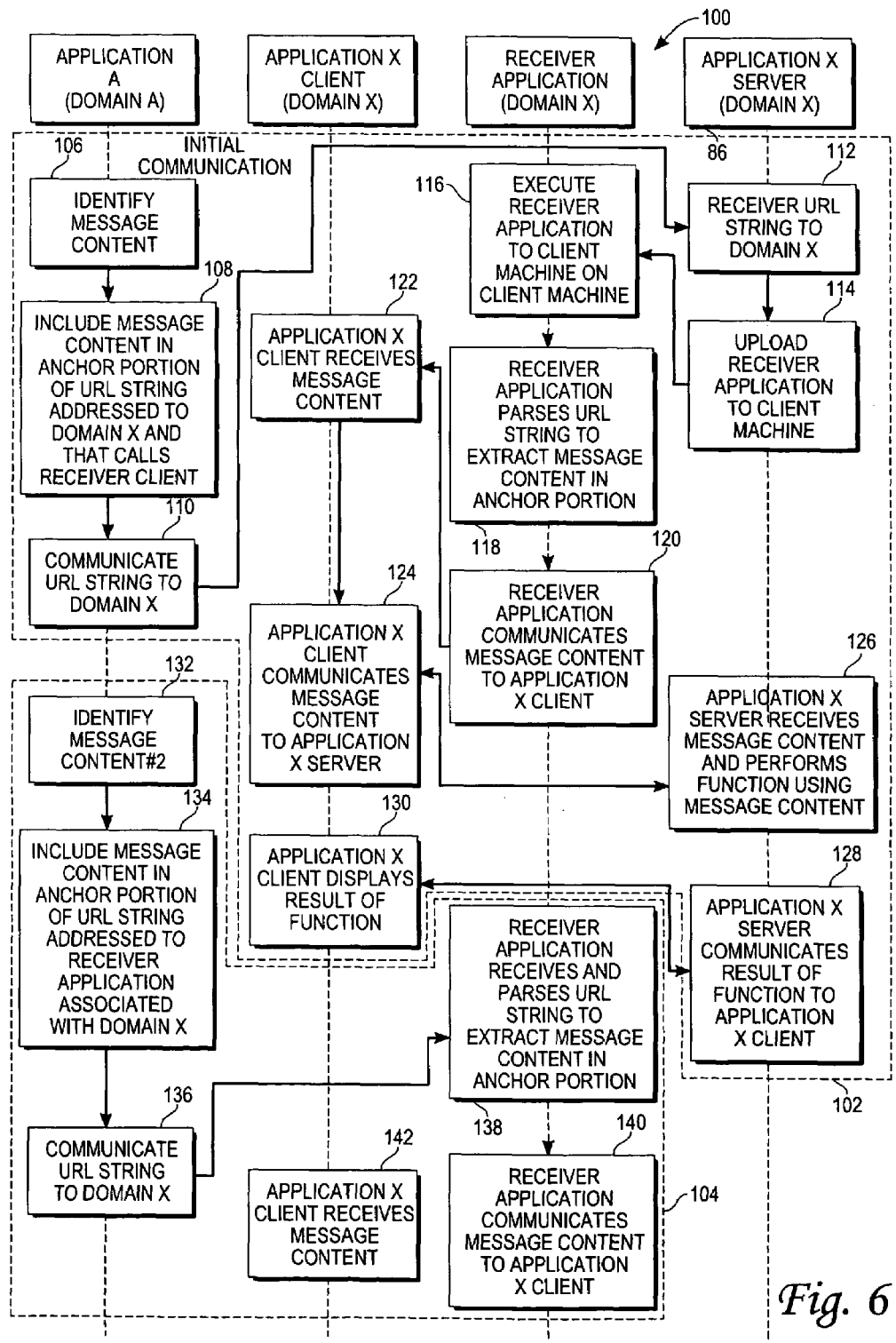
FIG. 6 is an interaction flow chart illustrating a method, according to one exemplary embodiment of the present invention, to communicate data between applications associated with different Internet domains, where such communication of the data occurs at the client-side.

FIG. 6 is an interaction flow chart illustrating a method 100, according to an exemplary embodiment of the present invention, to communicate data between different Internet domains utilizing, for example, the structures described above with reference to FIG. 5 as existing within the networked environment 70. The method 100 is illustrated in FIG. 6 to include an initial communication 102, followed by one or more subsequent communications 104. Starting at block 106, the first application (e.g., application A associated with domainA) on the first domain identifies data (e.g., message content) to be communicated to the second application on the second domain (e.g., application X on domainX).

At block 108, the first application then includes the data in an anchor portion of a URL string that is addressed to the second domain, and that calls code from the second domain 82 to be executed within the browser instance 78 as the receiver client. This called code includes the checker logic 92. An example of a URL string that may be generated at block 108 is:

"http://www.domainX.com/receiver.html#message".

In this exemplary URL, the data that is included in the anchor portion 62 is the text "message". It will be appreciated that the data that is included in the URL string could be any data type, including alphanumeric, graphic, audio or video data. The above exemplary URL string is also, it will be noted, addressed to the second domain 82, and also calls an HTML document, namely "receiver.html" that is utilized to instantiate the browser instance 78 as a receiver client. Specifically, in the exemplary embodiment, the document "receiver.html" includes scripts that operate as the checker logic 92, poll a URL change for the browser instance 78, and notify or act upon detection of such a change.

Moving on to block 110, the URL string created at block 108 is then communicated to the second domain 82, and more specifically to the application server 86. FIG. 6 indicates the operations performed at blocks 106, 108 and 110 as being performed at the first application, without any specificity as to whether these operations were performed at the client or the server side. In various embodiments of the present invention, the operations at blocks 106, 108 and 110 may in fact be performed at either the client or the server side for the relevant application (e.g., application A). The communication of the URL string at block 110 to the application server 86 associated with the second domain 82 only occurs during the initial communication 102, and is for the purpose of instantiating the browser instance 78 that operates as the receiver client. In subsequent communications 104, this call to the server side of the second domain (e.g., domainX) is not necessary and all communications may occur at the client side.

At block 112, the second application server 86 receives the URL string, authored at mark 108, and at block 114 proceeds to upload the receiver application (e.g., "receiver.html") to the client machine 72.

At block 116, a browser application hosted on the client machine 72 creates the browser instance 78 that operates as the receiver application. At block 118, the browser instance 78 parses the received URL string to extract the data contained in the anchor portion 62 thereof. Whereafter, at block 120, the browser instance 78 communicates the extracted data to the browser instance 76, which is instantiated as the application client for the second application (e.g., application X).

At block 122, the browser instance 76, acting as the second application client, receives the extracted data and, at block 124, the browser instance 76 may optionally communicate the extracted data to the second application server 86 associated with the second domain 82. The arrow 125 in FIG. 5 indicates this communication.

At block 126, the second application server 86 receives the extracted data, and may optionally perform one or more functions utilizing this data.

At block 128, the second application server 86 may communicate the results of such a function back to the browser instance 76 whereafter, at block 130, the browser instance 76 may display the results of this function to a user, or may perform some other operation utilizing these results.

Moving on to the subsequent communications, at block 132 the first application (e.g., application A) may identify further data to be communicated to the second application (e.g., application X). At block 134, this data is again included within an anchor portion of a URL string that is addressed to the browser instance 76, which operates as the receiver application. For example, such a URL may appear as "http://www.domainX.com/receiver.html#message2".

At block 136, the authored URL string is then communicated to the browser instance 76 which, at block 138, receives and parses the URL string to extract the data that is embedded in the anchor portion 62 of the relevant URL string. It will be noted that the browser instance 78 was previously instantiated on the client machine 72, and thus the relevant URL is recognized by an underlying browser application as being identical to the URL registered for the instantiated browser instance 78, except that an anchor portion is embedded therein. Accordingly, as described above, the communication of the URL string at block 136 will not cause the underlying browser application to make a call to the second application server 86, but will merely cause the underlying browser application to attempt to locate the identified anchor location 64 within the browser instance 78. As also noted above, regardless of whether the browser application locates or fails to locate the identified anchor location 64, the URL string communicated at block 136 is registered as the extant URL for the browser instance 78.

Moving on now to block 140, the browser instance 78, having parsed and extracted the data within the received URL string, then communicates this data to the browser instance 76, operating as the application client for the second application. At block 142, the browser instance 76 receives the data content which may then, for example, be communicated to the second application server 86, or may be utilized by a script embedded within the browser instance 76 to perform one or more functions.

Figure 7:
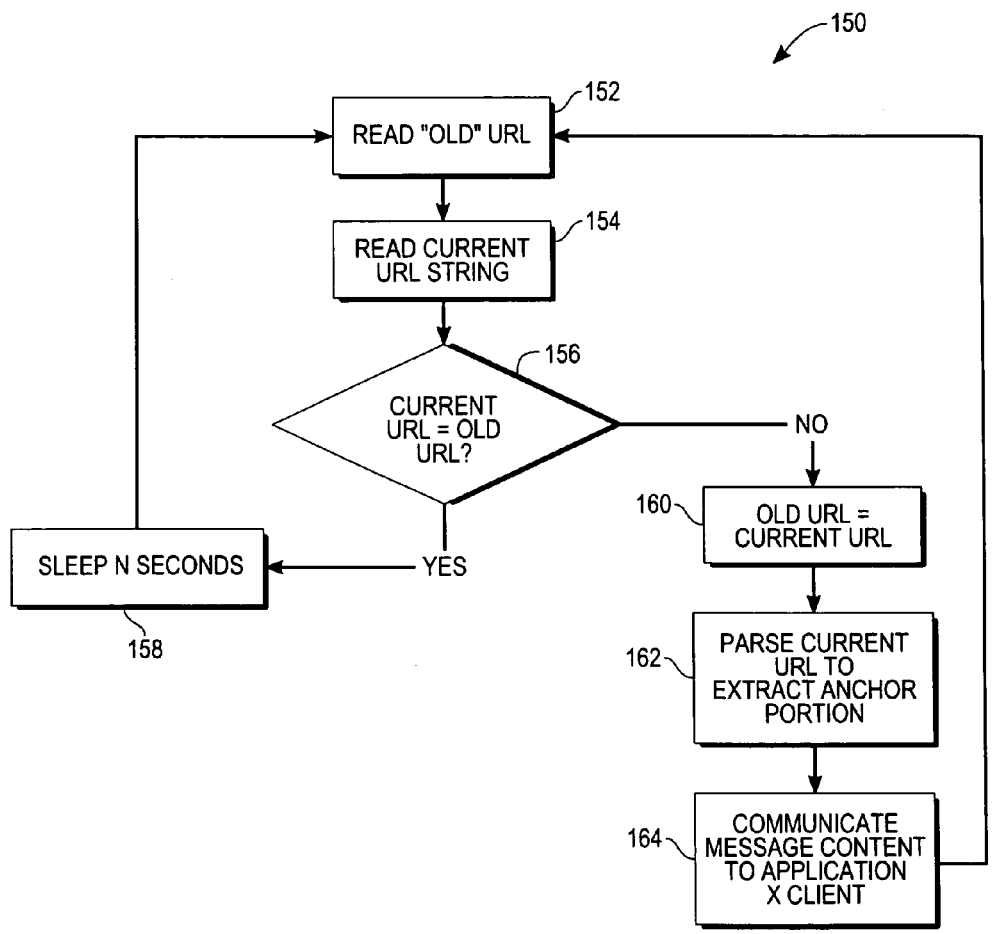
FIG. 7 is a flow chart illustrating a method, according to an exemplary embodiment of the present invention, at a receiver application, determining the reception of a new URL string that includes data received from an application associated with a different Internet domain.

FIG. 7 is a flowchart illustrating method 150, according to an exemplary embodiment of the present invention, to detect a change in the URL registered for a browser instance, and to extract data from within a new URL. In one exemplary embodiment of the present invention, the method 150 is performed by the checker logic 92, which is illustrated in FIG. 5 to form part of the receiver application of the browser instance 78.

The method 150 commences at block 152, with the checker logic 92 performing a read of an "old" URL that is stored by the checker logic 92 in connection with the browser instance 78. At block 154, the checker logic 92 then reads a current URL string associated with the browser instance 78.

At decision block 156, the checker logic 92 makes a determination as to whether the current URL, registered for the browser instance 78, corresponds exactly to the "old" URL that is stored in connection with the browser instance 78. It will be appreciated that the current URL for the receiver application may have changed as a result of the browser instance 74 having communicated a URL string that identifies the browser instance 78, but:

(1) Introduces a new anchor portion 62 that is absent from the "old" URL, or (2) Introduces a new anchor portion 62 that is different from an anchor portion for the "old" URL.

In the event that the old URL is determined, at decision block 156, to correspond to the current URL, the method 150 progresses to block 158, where the checker logic 92 sleeps for a predetermined time period (e.g., N seconds), whereafter the method 150 loops back to block 152.

On the other hand, should it be determined at block 156 that the current URL string does not correspond to the old URL string, the method 150 progresses to block 160, where the current URL string is then saved and registered as the "old" URL string.

At block 162, the checker logic 62 then proceeds to parse the current URL string to identify the anchor portion thereof (e.g., by registering the above described #), and to extract the data that appears into the anchor portion of the current URL.

At block 164, the checker logic 92 then communicates the extracted data from the browser instance 78 to the browser instance 76. As the browser instances 76 and 78 are both associated with a common domain (e.g., domainX), the communication of data between these browser instances 76 and 78 is not barred in terms of the "Same Origin Policy".

In summary, the method and system to pass data between an application associated with a first domain to an application associated with another domain has been described.

Figure 8:
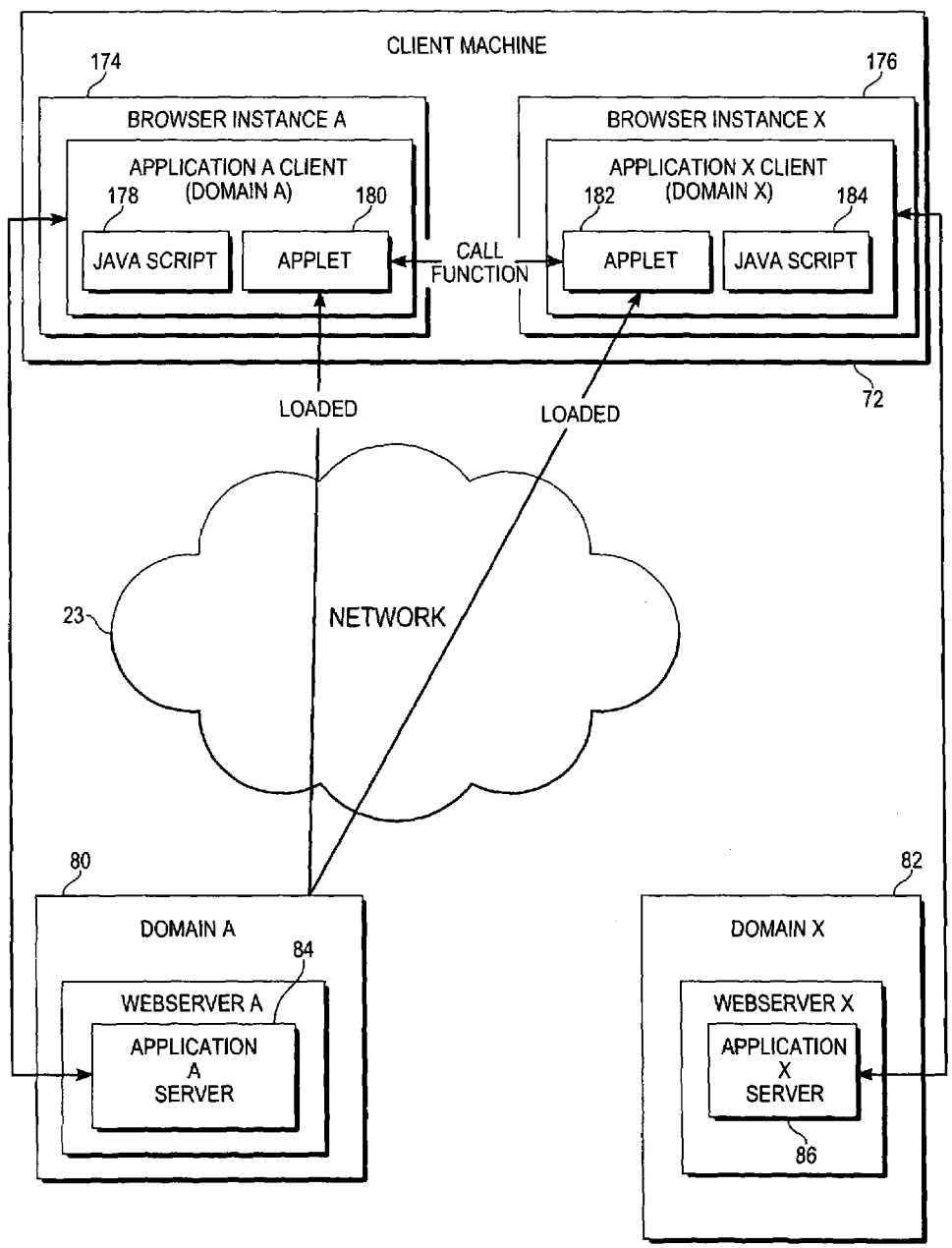
FIG. 8 is a block diagram illustrating a system, according to an alternative embodiment of the present invention, to facilitate the communication of data between applications associated with different Internet domains, where such communication of the data occurs at the client-side.

FIG. 8 is a block diagram illustrating a networked environment 170 in which an alternative embodiment of the present invention may be implemented.

As with the exemplary embodiment illustrating FIG. 5, the embodiment illustrated in FIG. 8 illustrates two browser-based applications (e.g., application A and application X) that are associated with two separate and distinct domains (e.g., domain A and domain X). To this end, FIG. 8 illustrates a first browser instance 174 functioning as a first application client and communicating with a first application server 84, and a second browser instance 176 operating as a second application client and communicating with a second application server 86.

The first browser instance 74 is shown to include a first Java script 178 and a first Java applet 180, while the second browser instance 176 is shown to include a second Java script 184 and a second Java applet 182. FIG. 8 also illustrates that both the first and second Java applets 180 and 182 originate from a common domain (e.g., domainA). Each of the Java applets 180 and 182 operates as a sender and receiver of data with respect to the other Java applets and, as both applets 180 and 182 originate from the first domain, such communications of data are permitted in terms of the "Same Origin Policy". It will further be appreciated that, as the applets 180 and 182 originate from the same domain, they may be readily configurable by a common owner to communicate with each other.

While the exemplary embodiment of the present invention is described as utilizing Java script and Java applets, these are merely examples of applications, and any number of other well known application types (e.g., ActiveX controls and Visual Basic controls) could be utilized to implement alternative embodiments of the present invention. Any mechanism (e.g., Macromedia Flash) that utilizes Java script to communicate may also be used in various embodiments of the invention.

At block 201, at the first domain 80 (e.g., domainA), first and second embedded applications, in the exemplary form of the Java applets 180 and 182, are configured to communicate. Specifically, in Java objects can be shared between multiple other objects as long as these shared objects run on the same Java Virtual Machine. In one embodiment, the objects are marked STATIC and accordingly become available from every other part of the Java code. For example, if applets A and B are running on a common browser instance, then applet A can communicate with applet B, but if these applets are running on different browser instances, then they will not be able to communicate. Java applets are configured to communicate by embedding such applets in an HTML page and associating a name with each such applet. A Java script can call <appletname>.functionname( ) to pass messages, and a Java applet can call Java script functions using names by referring the HTML page object. As both the applets 180 and 182 originate from the same domain, it will be appreciated that these applets will typically have a common owner (or source) and are accordingly readily configurable to communicate with each other.

Figure 9:
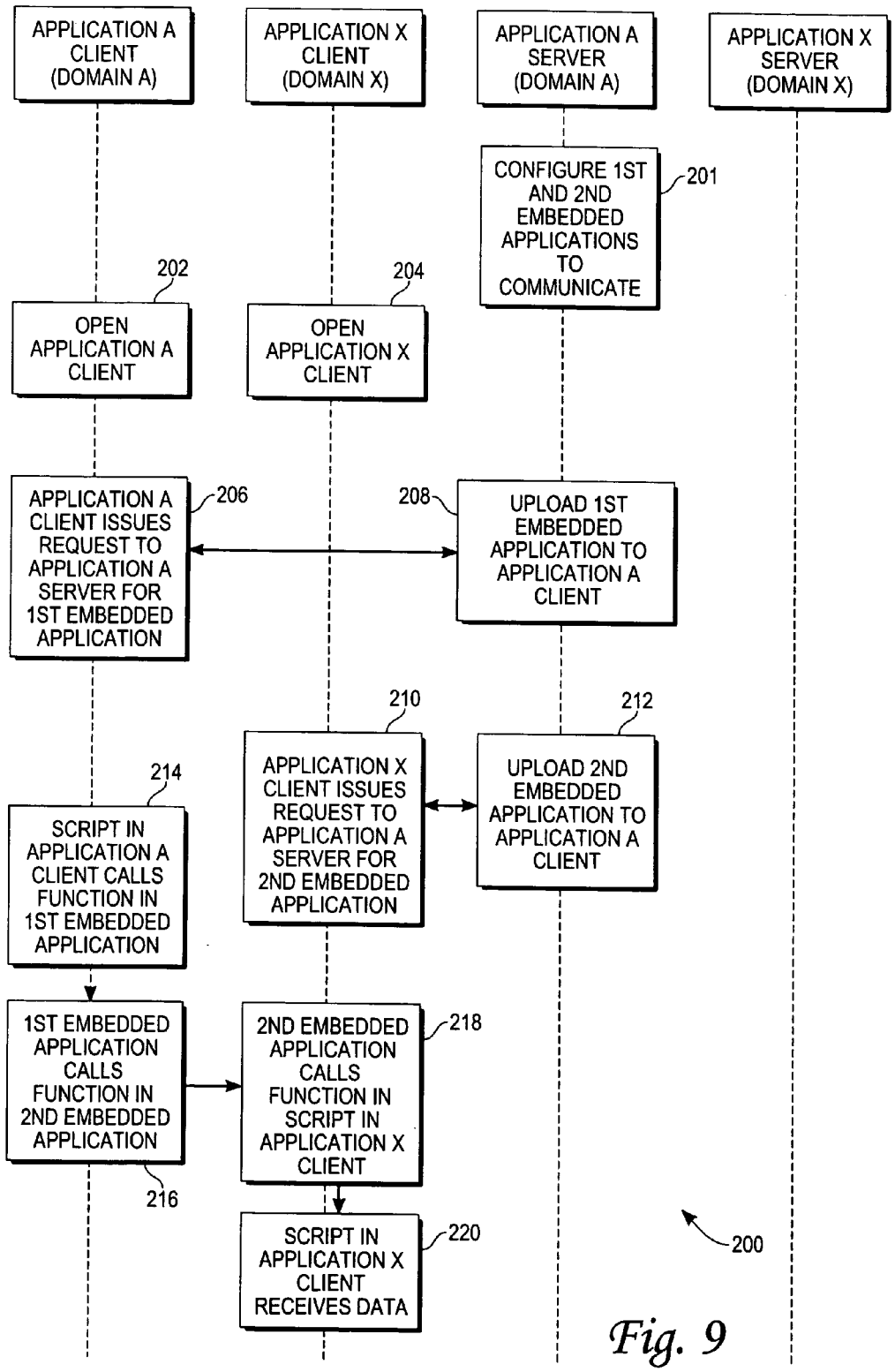
FIG. 9 is a flow chart illustrating a method, according to an alternative embodiment of the present invention, to facilitate the communication of data between applications associated with different Internet domains, where such communications occur at the client-side.

The various operations that are performed by components of the networked environment 170 will now be described with reference to FIG. 9. FIG. 9 is a flowchart illustrating a method 200, according to an exemplary embodiment of the present invention, to communicate data between different Internet domains. The method 200 commences at block 202 with the instantiation of the first browser instance 174, to thereby open the first application agent. At block 204, the second browser instance 176 is instantiated, to thereby open the second application client. The instantiations that occur at blocks 202 and 204 may be as a result of a user clicking on a particular URL to open each of the browser instances 174 or 176. Alternatively, one or both of the browers instances 174 and 176 may be automatically opened by other functions and processes.

The first browser instance 174 having been instantiated at block 202, at block 206 code associated with the first application (e.g., an uploaded HTML document) causes the first browser instance 174 to issue a request to the first application server 84 for the first embedded application, in the exemplary form of the Java applet 180. At block 206, the first application server 84 then uploads the Java applet 180 to the first browser instance 174.

Similarly, at block 210, the second browser instance 176 issues a request to the first application server 84 for the second embedded application, in the exemplary form of the Java applet 182. Responsive to this request, at block 212, the application server 84 uploads the Java applet 182 to the browser instance 176.

Accordingly, both the first and second embedded applications originate from a common domain, and are executable within different browser instances 174 and 176, each associated with a different Internet domain.

An exemplary use scenario in which the first browser instance 174 communicates data to the second browser instance 176 will now be described. The present exemplary embodiment does allow for each of the instances 174 and 176 to both issue and receive requests and responses for data.

At block 214, the Java script 178, embedded within the browser instance 174, calls a function within the Java applet 180, the called function operating to communicate data to the browser instance 176, and specifically to the Java script 184 embedded within the browser instance 176. Accordingly, the function call at block 214 includes the data to be communicated.

At block 216, the Java applet 180 then performs a function call to the second Java applet 182, this function call being to facilitate the communication of the relevant data between the applets 180 and 182.

At block 218, the Java applet 182 then in turn calls a function in the Java script 184, this call in turn including the data to be communicated. At block 220, the Java script 184 within the browser instance 176 receives the data that originates with the Java script 178. For example, for a Java script to Java applet call, a function may be named as "sendMessage (msg)" and for Java applet to Java script call, a function "receiveMessage(msg)" may be called.

The above-described exemplary embodiments of the present invention may find application in communicating data, or messages, between browser-based applications in a multitude of scenarios. For example, where a first browser-based application includes Java script on the client side that receives the ticker symbols and stock price information, the above-described embodiments of the present invention could be utilized to communicate the stock price information to a second browser-based application that may take action based on a stock price. For example, the second browser-based application may issue warnings when a stock price exhibits a predetermined degree of movement, or could even initiate automated buy and sell operations.

In a further use scenario, a first browser-based application may be an inventory control application that communicates inventory information to a second, browser-based order application that is tasked with replenishing inventory levels should these fall below a predetermined level.

In a third use scenario, the first browser-based application may be a shopping application that communicates data to a second browser-based shopping cart application.

It should also be noted that, while the above-described embodiments have focused on the communication of data from a first browser-based application to a second browser-based application, the present invention could readily be deployed to provide both the first and the second browser-based applications with the capability to both receive and transmit messages and data.

Figure 10:
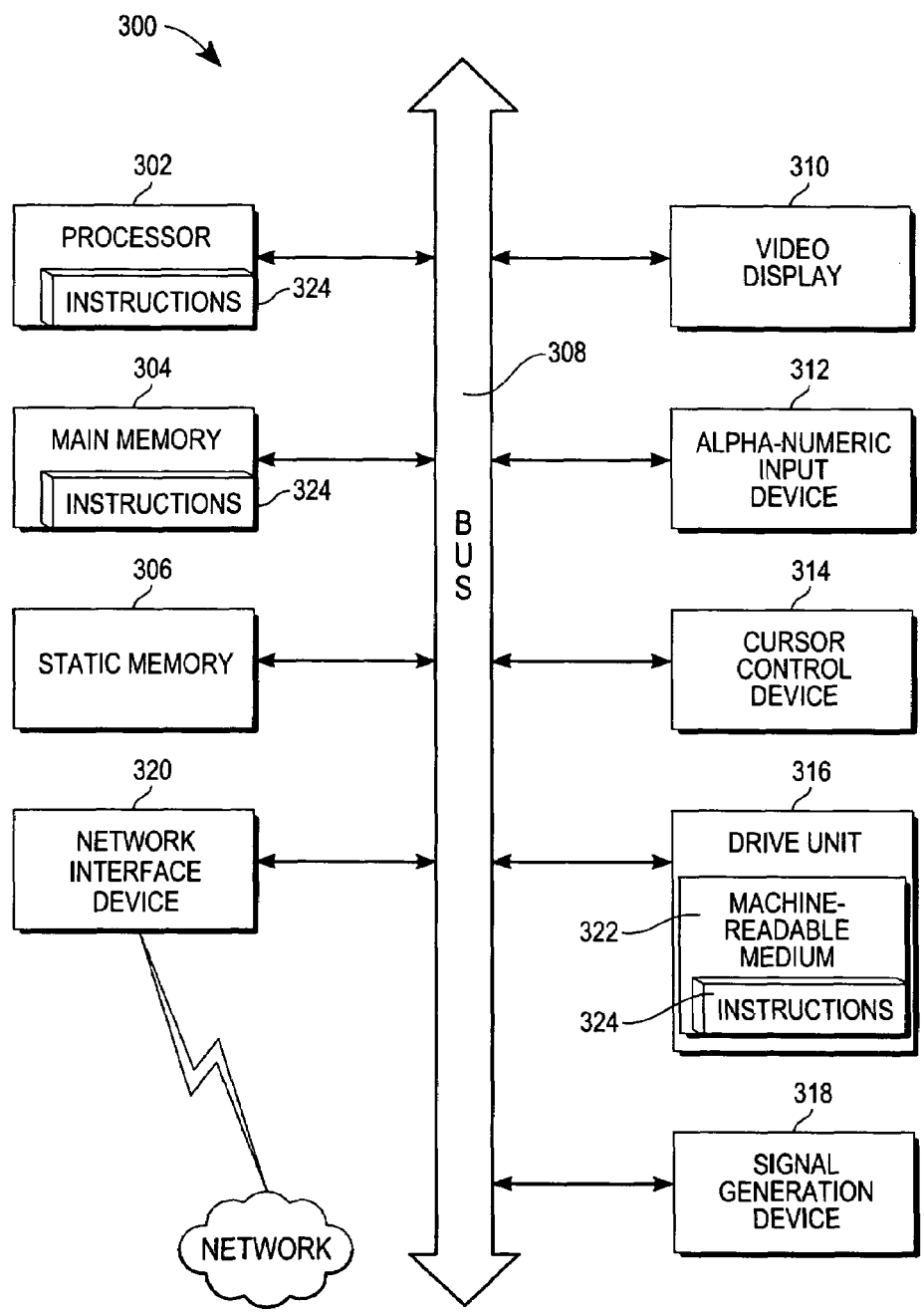
FIG. 10 is a block diagram illustrating a machine, in the exemplary form of a computer system, which stores a set of instructions for causing the machine to perform any of the methodologies discussed herein.

FIG. 10 shows a diagrammatic representation of machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320.

While the machine-readable medium 392 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, optical and magnetic media, and carrier wave signals.

Thus, a method and system to communicate to data between different to Internet domains have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method to communicate data between different Internet domains, the method including:
    at a first application supported within a browser instance and associated with a first Internet domain, embedding the data in an anchor portion of a URL string that identifies a second Internet domain that is different from the first Internet domain where the first application is prohibited by browser same origin policy from communicating data with a second application supported within another browser instance and associated with the second Internet domain wherein the first application and the second application reside on a common machine;
    embedding an identifier, that identifies the second application, within the URL string;
    communicating the URL string to the second application associated with the second Internet domain; and
    at the second application, receiving the URL string and extracting the data therefrom,
wherein the receiving of the URL string at the second application does not cause the second application to perform a server access to a server associated with the second domain and wherein the first application invokes execution of the second application by communicating the URL string to the server associated with the second domain.

2. The method of claim 1, wherein the second application communicates the data to a third application, associated with the second Internet domain, the third application communicating the data to an application server associated with the second Internet domain.

3. The method of claim 2, wherein the second application communicates the data to a client of the third application, wherein both the client of the third application and the second application reside on a common machine.

4. The method of claim 1, including communicating one or more additional URL strings to the second application, each additional URL string including further data embedded in a respective anchor portion of each additional URL string.

5. The method of claim 1, including, at the second application, periodically determining whether a new URL string has been received and, if so, extracting further data from an anchor portion of the new URL string.

6. The method of claim 5, wherein the second application includes client-side executable logic to determine receipt of the new URL string.

7. The method of claim 1, including, at the first application, embedding an identifier for the second application within the URL string, thereby to cause download of the second application from the second Internet domain.

8. A system to communicate data between different Internet domains, the system comprising:
    a first application associated with a processor supported within a browser instance, and associated with a first Internet domain, to embed the data in an anchor portion of a URL string that identifies a second Internet domain that is different from the first Internet domain, to embed an identifier that identifies a second application within the URL string where the first application is prohibited by browser same origin policy from communicating data with the second application supported within another browser instance and associated with the second Internet domain, the first and second application residing on a common machine and to
    communicate the URL string to the second application associated with the second Internet domain; and
    the second application to receive the URL string and to extract the data therefrom,
wherein the second application does not perform a server access to a server associated with the second domain responsive to receipt of the URL string and wherein the first application invokes execution of the second application by communicating the URL string to the server associated with the second domain.

9. The system of claim 8, including a third application associated with the second Internet domain, wherein the second application is to communicate the data to a third application, and the third application is to communicate the data to an application server associated with the second Internet domain.

10. The system of claim 9, wherein the second application is to communicate the data to a client of the third application, wherein both the client of the third application and the second application reside on a common machine.

11. The system of claim 8, wherein the first application is to communicate one or more additional URL strings to the second application, each additional URL string including further data embedded in a respective anchor portion of each additional URL string.

12. The system of claim 8, wherein the second application is periodically to determine whether a new URL string has been received and, if so, to extract further data from an anchor portion of the new URL string.

13. The system of claim 12, wherein the second application includes client-side executable logic to determine receipt of the new URL string.

14. The system of claim 8, wherein the first application is to embed an identifier for the second application within the URL string, thereby to cause download of the second application from the second Internet domain.

15. A system to communicate data between different Internet domains the system including:

first means associated with a processor, associated with a first Internet domain, for embedding the data in an anchor portion of a URL string from the first domain, the anchor portion of the URL string identifying a second Internet domain that is different from the first Internet domain for embedding an identifier, that identifies second means, within the URL string, and for communicating the URL string to second means associated with the second Internet domain wherein the first means and the second means function on a common machine, and;

the second means for receiving the URL string and for extracting the data therefrom, wherein the second means does not perform a server access to a server associated with the second domain responsive to receipt of the URL string and wherein the first means invokes execution of the second means by communicating the URL string to the server associated with the second domain.

16. A machine-readable medium storing a set of instructions, executable by a machine, to cause the machine to communicate data between different Internet domains utilizing a method, including:

at a first application associated with a first Internet domain, embedding the data in an anchor portion of a URL string that identifies a second Internet domain that is different from the first Internet domain wherein the first application and a second application reside on a common machine;

embedding an identifier, that identifies the second application, within the URL string;

communicating the URL string to the second application associated with the second Internet domain; and at the second application, receiving the URL string and extracting the data therefrom, wherein the receiving of the URL string at the second application does not cause the second application to perform a server access to a server associated with the second domain and wherein the first application invokes execution of the second application by communicating the URL string to the server associated with the second domain.

\* \* \* \* \*